(12) United States Patent
Bruck et al.

(10) Patent No.: US 10,503,742 B2
(45) Date of Patent: Dec. 10, 2019

(54) ELECTRONIC DEVICE AND METHOD OF SEARCHING DATA RECORDS

(71) Applicant: BlackBerry Limited, Waterloo (CA)

(72) Inventors: James Arthur Bruck, Kanata (CA); Geordon Thomas Ferguson, Mississauga (CA); Song Tao Qi, Kanata (CA); Francis Patrick Judge, Andover, MA (US); Cora Lynne Collins, Dunrobin (CA)

(73) Assignee: BlackBerry Limited, Waterloo (CA)

( * ) Notice: Subject to any disclaimer, the term of this patent is extended or adjusted under 35 U.S.C. 154(b) by 262 days.

(21) Appl. No.: 14/924,534

(22) Filed: Oct. 27, 2015

(65) Prior Publication Data

US 2017/0116293 A1 Apr. 27, 2017

(51) Int. Cl.
*G06F 16/248* (2019.01)
*G06F 16/9535* (2019.01)
*G06F 16/903* (2019.01)

(52) U.S. Cl.
CPC .......... *G06F 16/248* (2019.01); *G06F 16/903* (2019.01); *G06F 16/9535* (2019.01)

(58) Field of Classification Search
CPC ......... G06F 17/30554; G06F 17/30964; G06F 17/30867; G06F 16/248; G06F 16/903; G06F 16/9535
See application file for complete search history.

(56) References Cited

U.S. PATENT DOCUMENTS 6,535,874 B2 * 3/2003 Purcell ............. G06F 17/30545
6,674,445 B1 1/2004 Chithambaram et al.
8,229,913 B2 * 7/2012 Arrouye ........... G06F 17/30067
707/706
9,201,672 B1 * 12/2015 Arana ................. G06F 17/3089
2004/0049514 A1 * 3/2004 Burkov ............. G06F 17/30707
(Continued)

FOREIGN PATENT DOCUMENTS

EP    1630642 A1 *  3/2006  ........ G06F 17/30011
EP    2874151 A1    5/2015

OTHER PUBLICATIONS

Making TV Apps Searchable, Jan. 12, 2015, 7 pages.*
(Continued)

*Primary Examiner* — Albert M Phillips, III
(74) *Attorney, Agent, or Firm* — Borden Ladner Gervais LLP; Todd Keeler (57) ABSTRACT

A portable electronic device includes a display for displaying results of a search for data records, and a memory for storing a plurality of applications and, for each application of the plurality of applications, respective associated metadata identifying a location of the data records associated with the application, a mapping for associating data in the data records with a unified format utilized by a search client, and an identification of filterable fields and the filtering method. The portable electronic device also includes a processor coupled to the display and to the memory to utilize the metadata stored in association with the plurality of applications to perform a search of the data records and identify a plurality of the data records that accord with the search query to provide search results, and provide the search results in a unified format on the portable electronic device.

16 Claims, 4 Drawing Sheets

(56) References Cited

U.S. PATENT DOCUMENTS

| | | | |
|---|---|---|---|
| 2008/0005079 A1* | 1/2008 | Flake | G06F 17/30867 |
| 2009/0204578 A1* | 8/2009 | Dang | H04L 41/0213 |
| 2012/0016861 A1* | 1/2012 | Edwards | G06F 17/30023 |
| | | | 707/707 |
| 2013/0212099 A1* | 8/2013 | Dellinger | G06F 17/3064 |
| | | | 707/731 |
| 2013/0212528 A1* | 8/2013 | Lazaridis | G06F 3/14 |
| | | | 715/810 |
| 2015/0134638 A1 | 5/2015 | Grosman et al. | |
| 2015/0227523 A1* | 8/2015 | LeBeau | G06F 16/951 |
| | | | 707/723 |
| 2016/0321264 A1* | 11/2016 | Neagovici-Negoescu | |
| | | | G06F 17/3053 |

OTHER PUBLICATIONS

Search Overview, Jan. 19, 2014, 2 pages.*
European Patent Application No. 16191448.6, Extended European Search Report dated Mar. 7, 2017.
Print out of "Intro to ContentProviders", retrieved on Oct. 14, 2015 from http://developer.xamarin.com/guides/android/platform_features/intro_to_content_providers/, 25 pages.
Print out of "Creating a Search Interface", retrieved on Oct. 14, 2015 from http://developer.android.com/guide/topics/search/search-dialog.html, 18 pages.
European Patent Application No. 16191448.6, Office Action dated Dec. 6, 2018, 4 pages.

* cited by examiner

ELECTRONIC DEVICE AND METHOD OF SEARCHING DATA RECORDS

FIELD OF TECHNOLOGY

The present disclosure relates to the control of electronic devices to search data records and provide the search results.

BACKGROUND

Portable electronic devices have gained widespread use and provide a variety of functions including, for example, telephonic, electronic messaging, calendar, and other personal information manager (PIM) application functions, digital camera and digital photograph storage, and so forth.

Applications are stored on the portable electronic device and are executed by a processor of the portable electronic device in order to provide the functionality referred to above. Data records associated with each application are associated with the application. The structure of the data records differs for each application.

Improvements in searching through the data records of various applications are desirable.

BRIEF DESCRIPTION OF THE DRAWINGS

Embodiments of the present disclosure will now be described, by way of example only, with reference to the attached figures, in which.

DETAILED DESCRIPTION

The following generally describes a portable electronic device including a display for displaying results of a search for data records, and a memory for storing a plurality of applications and, for each application of the plurality of applications, respective associated metadata identifying a location of the data records associated with the application, a mapping for associating data in the data records with a unified format utilized by a search client, and an identification of filterable fields and the filtering method. The portable electronic device also includes a processor coupled to the display and to the memory to utilize the metadata stored in association with the plurality of applications to perform a search of the data records and identify a plurality of the data records that accord with the search query to provide search results, and provide the search results in a unified format on the portable electronic device.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device such as a portable electronic device. Examples of portable electronic devices include mobile, or handheld, wireless communication devices such as cellular smart-phones, wireless organizers, personal digital assistants, tablet computers, and so forth.

Figure 1:
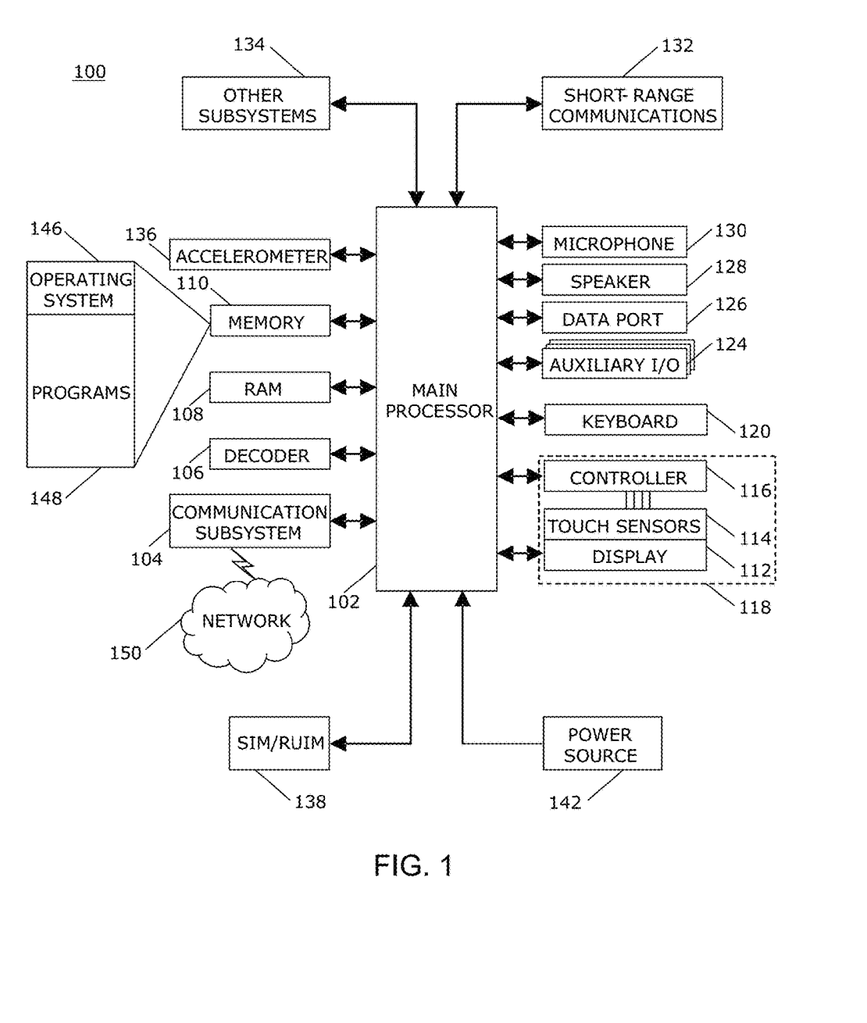
FIG. 1 is a block diagram of a portable electronic device in accordance with the present disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, data wireless networks, voice wireless networks, and networks that support both voice and data communications. A battery 142, which may include one or more rechargeable batteries, powers the portable electronic device 100.

The processor 102 interacts with other components, such as a Random Access Memory (RAM) 108, memory 110, a touch-sensitive display 118, a keyboard 120, a camera 122, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 may be utilized for entry of characters such as alphabetical characters, numeric characters, punctuation, or symbols.

The touch-sensitive display 118 includes a display 112 and touch sensors 114 that are coupled to at least one controller 116 that is utilized to interact with the processor 102. Input via a graphical user interface is provided via the touch-sensitive display 118 and the keyboard 120. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data records, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

As indicated above, the portable electronic device 100 includes applications that are stored in the memory 110 and are executable by the processor 102 to provide various functions on the portable electronic device. The applications may include, for example, an email message application, a calendar application, a contacts application, a digital photograph application, a music player or audio application, and other suitable applications.

The Android operating system for portable electronic devices, for example, utilizes a content provider for data records for each application. Each content provider acts as an interface and manages access to the data records associated with the application. For example, in the memory 110. Thus, for example, email messages are exposed via an email content provider in the memory 110, calendar data records are exposed via a calendar content provider in the memory 110, contact data records are exposed via a contact content provider in the memory 110, digital photos and digital audio files are exposed via a media content provider in the memory 110, Similarly, data records associated with other applications may be exposed via other content providers in the memory 110.

In addition, other applications may utilize content providers to expose data records stored external to the portable electronic device 100. For example, a social media application may be resident on the portable electronic device 100 and may be utilized to store data records at a social media website that are accessible by the portable electronic device 100.

Each of these applications provides content that is stored and is accessible by the processor of the portable electronic device 100. Searching for data records of various types is desirable.

Queries are specific to the structure of the data records for each application, and this structure varies from application to application. Without specific information of the structure of the data, a query and sorting and filtering of the query results cannot be performed by a generic or general search client, which is an application that accesses the data records across all or many content providers for general search purposes. Performing a search across all such data also leads to inconsistencies compared to searches completed within each application.

To provide unified search results across a plurality of applications, metadata is stored for each of the applications. The metadata includes information to identify the location of the content providers associated with the application, which may be on the portable electronic device 100 or may be remote from the portable electronic device 100. The metadata also includes a mapping for associating data in the data records with a unified format utilized by a search client and an identification of filterable fields and the filtering method.

The mapping for associating data in the data records with a unified format includes a mapping of fields in the data records to search fields in the unified format by associating columns of data in the data records with unified format columns.

The metadata may be stored in the memory 110, in a single file on the portable electronic device 100 such that the file includes metadata associated with a plurality of the application. Thus, the metadata associated with two or more applications is located in the same file or location in the memory 110. Alternatively, the metadata associated with an application is stored with the associated application such that the metadata for various applications is not all stored in the same file or data location.

The metadata is identified by the processor 102 of the portable electronic device 100 prior to initiation of a search utilizing the metadata. The metadata may be identified, for example, when an application is downloaded onto the portable electronic device 100. The metadata may accompany the application such that the metadata is downloaded with the application. Thus, the processor 102 is configured to search for the metadata in the memory 110 before utilizing metadata.

The metadata may be, for example, included in an Extensible Markup Language (XML) metadata file.

A simplified example of part of the metadata associated with a calendar application is included below.

```
<searchable
   mime_type="vnd.ped.calendar"
   resource_package="com.device.infrastructure"
   image="@drawable/universalsearch_ic_sb_calendar"
   label_display_name="@string/universalsearch_calendar"
   uri_authority="com.device.universalsearch.adapter.calendar"
uri_path="calendar">
   <list_item_mapping>
      <map_item list_item_column="primary_text"
mapped_column="title"/>
      <map_item list_item_column="secondary_text"
mapped_column="description"/>
      <map_item list_item_column="tertiary_text"
mapped_column="eventLocation"/>
      <map_item list_item_column="timestamp"
mapped column="dtstart"/>
      <map_item list_item_column="state" mapped_column="dtend"/>
      <map_item list_item_column="duid" mapped_column="_id"/>
   </list_item_mapping>
</searchable>
```

In this example, The mime_type="vnd.PED.calendar" identifies the type of searchable data records associated with the application as calendar events. The resource_package="com.device.infrastructure" and uri_authority="com.device.universalsearch.adapter.calendar" together identifies the location of the content provider associated with the application, which acts as an interface and manages access to the calendar data records. Thus, the metadata is associated with the content provider. The mapping for associating data in the data records with a unified format is included under <list_item_mapping> and, in this example, maps the columns of the calendar data records, including the "title", "description", "event location", and "dtstart" to unified format columns of "primary_text", "secondary_text", "tertiary_text", and "timestamp", respectively.

Although not included in the above example, the metadata also includes an identification of filterable fields and the filtering method. An example of part of the metadata associated with a messaging application is included below.

which the "from" column of the messages is mapped to the unified format column of "primary_text". Other column mappings may exist, however, only one column mapping is shown to simplify the present example.

The query API provided by the Android content provider is set forth in (http://developerandroid.com/reference/android/content/ContentResolver.html# query(android.net.Uri, java.lang.String[ ], java.lang.String, java.lang.String[ ], java.lang.String))
query(Uri uri, String[ ] projection, String, selection, String[ ] selectionArgs, String sortOrder)
There are two methods to pass query filters to the content provider using the Android content provider query API.
 1) A filter may be applied as URI parameters. In this case, the filter is passed to the query function as a part of the URI, e.g., query("content://content/provider/uri?column1=value1&column2=value2", projection, null, null, sortOrder)
 2) A filter may also be applied as selection arguments. In this case, the selection and selectionArgs parameter are

```
<searchable
   mime_type="vnd.ped.message"
   resource_package="com.device.infrastructure"
   image="@drawable/universalsearch_ic_sb_messages"
   label_display_name="@string/universalsearch_message"
   uri_authority="com.device.universalsearch.adapter.message"
uri_path="message">
   <filter_criteria>
      <filter label_display_name="@string/account_label"
domain_column="account_id" type="TEXT" apply_as="URI_PARAM"/>
      <filter label_display_name="@string/from" domain_column="from" type="TEXT"
apply_as="SELECTION_PARAM"/>
   </filter_criteria>
   <list_item_mapping>
      <map_item list_item_column="primary_text" mapped_column="from"/>
      . . .
   </list_item_mapping>
</searchable>
```

In this example, mime_type="vnd.ped.message" identifies the type of the searchable data records associated with the application as messages. The resource_package="com.device.infrastructure" and uri_authority="com.device.universalsearch.adapter.message" together identifies the location of the content provider associated with the application, which acts as an interface and manages access to the stored messages. In this example, two filters are included. Only one column mapping is shown in used, e.g., query("content://content/provider/uri", projection, "column1=? AND column2=?", ["value1", "value2"], sortOrder)
Depending on the content provider implementation, the query filter may be accepted in method 1) or method 2) or any combination of method 1) and method 2). In order to adapt to the different implementations among content providers, a search client that interacts with those content providers may implement specific logic for each content provider to pass down the query filter in different methods. This creates complexities to the search client implementation.

By specifying the filter information in the metadata, it eliminates the content providers specific logic from the client, instead, the client could use a general API to pass the filters, and in turn, the general API utilize the filter definition specified in the metadata to pass the filters to each content providers in the way it accepts.

The filters include a filter for filtering messages by account. For example, for filtering messages that are associated with one of a plurality of accounts for which messages are stored on or external to the portable electronic device. The metadata also identifies the filtering method or the application of the filter. In the example of filtering messages by account, the filter is applied as a Uniform Resource Identifier (URI) parameter when quering the messaging content provider, as indicated by the apply_as="URI_PARAM".

A second filter is included for filtering messages by sender or "from". In this example, the filter is applied as selection arguments when querying the message content provider, as indicated by apply_as="SELECTION_PARAM"/>.

Figure 2:
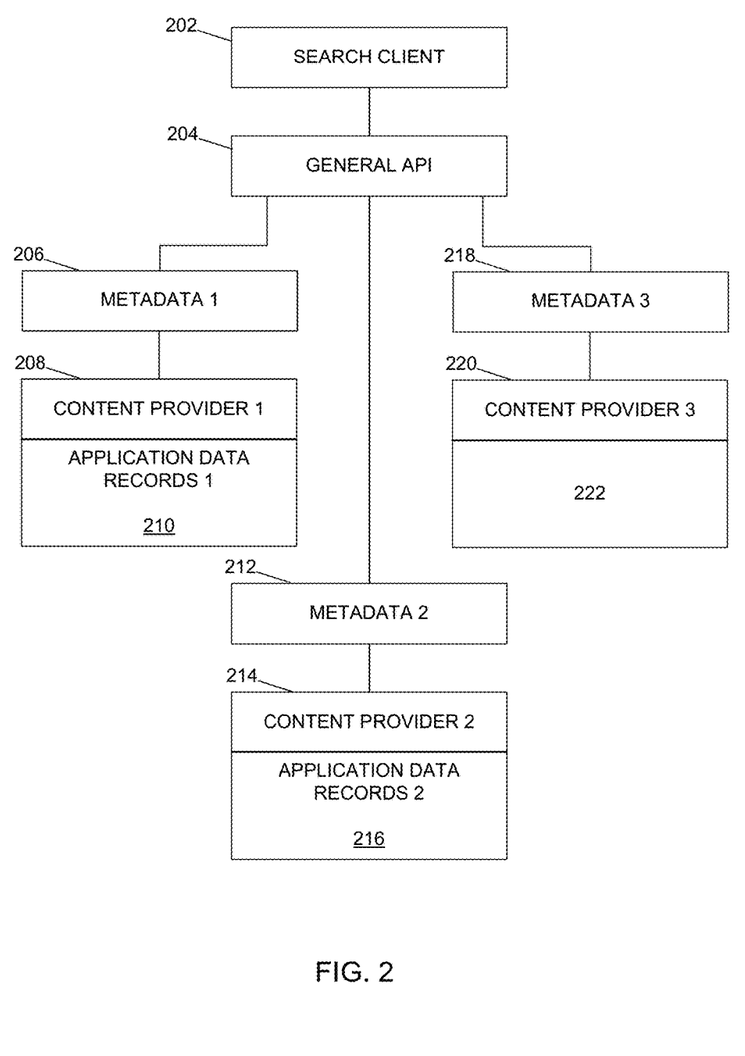
FIG. 2 is a simplified functional block diagram illustrating the relationship between a search client and data sources stored in association with applications in accordance with the present disclosure.

A simplified functional block diagram illustrating a relationship between a search client and data sources stored in association with applications is shown in FIG. 2. The elements shown and described may be implemented as software executed, for example, by the processor 102. Coding of software is within the scope of a person of ordinary skill in the art given the present description. Additional or fewer elements than shown and/or described may be utilized.

A search client 202 is illustrated. The search client 202 is utilized for conducting a search of data records such as email messages, calendar data records, digital photographs and so forth. The search client 202 uses a general application programming interface (API) 204 that accesses the metadata for each associated application. The metadata identifies the content provider for the associated application and the content provider is utilized to access the data records for that application. In the example shown in FIG. 2, the general API 204 utilizes the first metadata 206, which identifies the first content provider 208 to access the first data records 210 associated with a first application. Second metadata 212 identifies a second content provider 214 to access the second data records 216 associated with a second application. Similarly, third metadata 218 identifies a third content provider 220 to access the third data records 222. The search client 202, through the general API 204, utilizes a unified data format, also referred to herein as the unified format, that is provided by the mapping utilizing the first metadata 206, the second metadata 212, and the third metadata 218 via the respective content providers 208, 214, 220, to search the respective data records 210, 216, 222.

Figure 3:
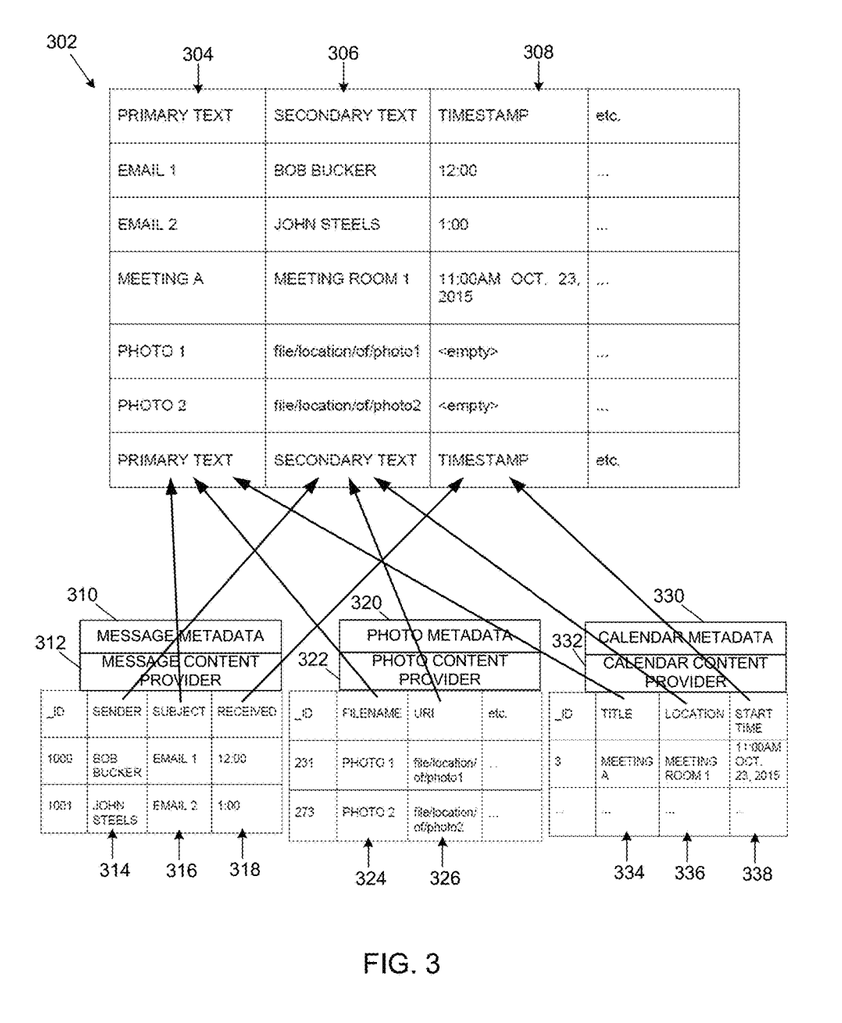
FIG. 3 illustrates one example of mapping of fields in data records to search fields in a unified format in accordance with the present disclosure.

An example of mapping of fields in data records to search fields in a unified format is shown in FIG. 3. The mapping of fields in data records to search fields in a unified format is carried out by the processor 102 of the portable electronic device 100 through the general API utilizing the metadata associated with each of the applications. In this example, the data in unified format is illustrated by the table 302, which includes the "Primary Text" column 304, "Secondary Text" column 306, and "Timestamp" column 308. The unified format may include any other suitable fields and any number of suitable fields or columns. In addition, the mapping of fields in the data records to columns or fields in the unified format is illustrated as an example only. The unified format may include other columns and the mapping of fields may differ from the mappings in the present example.

The data records, which include messages from a messaging application, digital photographs from a digital photograph application, and calendar records from a calendar application, include columns that are mapped to the "Primary Text" column 304, "Secondary Text" column 306, and "Timestamp" column 308 in the unified format.

The metadata 310 associated with the messaging application provides the mapping and the content provider 312 manages access to the messages from the messaging application. For the purpose of the present example, two messages are shown. Utilizing the metadata 310, the "Sender" column 314 is mapped to the "Secondary Text" column 306 in the unified format, the "Subject" column 316 is mapped to the "Primary Text" column 304 in the unified format, and the "Received" column 318 is mapped to the "Timestamp" column 308 in the unified format.

The metadata 320 associated with the digital photograph application provides the mapping and the content provider 322 manages access to the digital photographs from the digital photograph application. For the purpose of the present example, two digital photographs are shown. Utilizing the metadata 320, the "FileName" column 324 is mapped to the "Primary Text" column 304 in the unified format and the "URI" column 326 is mapped to the "Secondary Text" column 306. In the present example, no column in the digital photographs is mapped to the "Timestamp" column 308 in the unified format. Thus, columns in the unified format may remain empty.

The metadata 330 associated with the calendar application provides the mapping and the content provider 332 manages access to the calendar data records from the calendar application. For the purpose of the present example, one calendar data record is shown. Utilizing the metadata 330, the "Title" column 334 is mapped to the "Primary Text" column 304 in the unified format, the "Location" column 336 is mapped to the "Secondary Text" column 306 in the unified format, and the "Start Time" column 338 is mapped to the "Timestamp" column 308 in the unified format.

In the example of FIG. 3, in response to receipt of a search query in a search client on the portable electronic device 100, the search client utilizes the general API to perform a search of the messages, digital photographs, and calendar data records, and the results are returned and mapped to the unified data format, such as the data format illustrated in FIG. 3. The results in the unified data format may be displayed on the display of the portable electronic device 100 by the client using the generic rendering logic.

Figure 4:
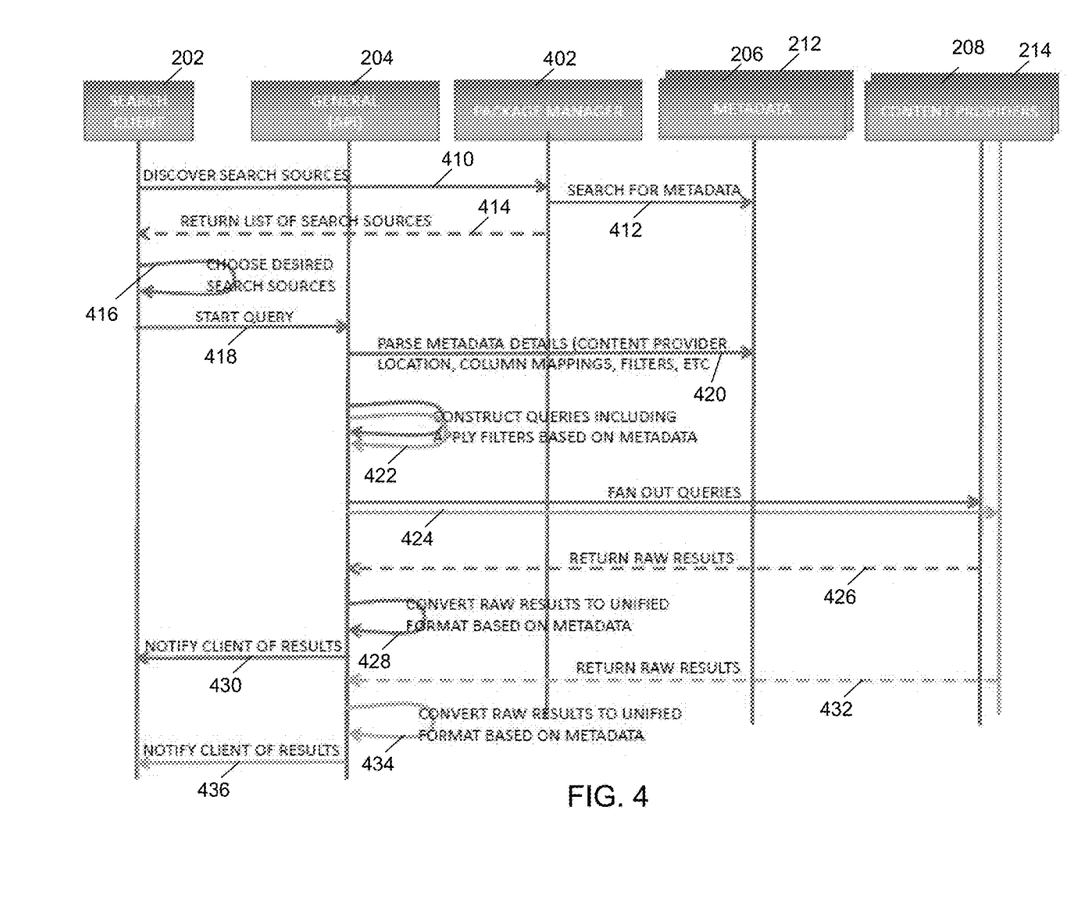
FIG. 4 is a sequence diagram illustrating a search for data records on a portable electronic device in accordance with the disclosure.

A sequence diagram illustrating processes of searching for data records on a portable electronic device is shown in FIG. 4. Coding of software for carrying out such processes is within the scope of a person of ordinary skill in the art given the present description. Additional or fewer processes than shown and/or described may be performed and the processes may be performed in a different order.

For the purposes of the present description, the same reference numerals are utilized herein as previously utilized with reference to the simplified functional block diagram shown in FIG. 2. For the purpose of simplicity and clarity in the present example, however, only two application data sources are present on the portable electronic device 100 and are searched and thus, metadata 206, 212 associated with only two data sources is illustrated. Correspondingly, only two content providers 208, 214 associated with two application data sources are illustrated. Other suitable numbers of data sources, content providers, and metadata may be utilized, however.

Metadata 206, 212 is stored on the portable electronic device 100 in association with respective applications.

The search client 202 searches for or identifies search sources by utilizing a package manager 402. The package manager 402 may be, for example, an Android Package Manager utilized to manage, for example, methods for querying and manipulating installed packages and related permissions. The search client 202 may begin the process of identifying search sources in response to initiation of a search client at the search client. The search client may begin the process of discovering the search sources at any time prior to performing a search, for example, at the search client start up time. The search client may also utilize a package manager's notification mechanism to actively listen to the application installation/uninstallation notifications on the device 100 and update the search source information.

The package manager 402 searches for and identifies all the metadata 206, 212 associated with respective applications at 412. The package manager 402 thus identifies metadata 206, 212 that includes information to identify the location of the data records associated with the application, a mapping for associating data in the data records with a unified format utilized by a search client, and an identification of filterable fields and the filtering method.

The package manager 402 returns a list of search sources, which are the metadata sources, to the search client 202 to provide access to the metadata 206, 212 at 414. Search sources are chosen at 416 based on the search configurations, which are user-selectable based on the available search sources returned in the list of search sources. Thus, in response to receipt of an indication of the sources of data for a search for which a query is initiated at the search client, the search sources are chosen at 416 and a search query sent from the search client 202 to the general API at 418. The general API 204 therefore performs the search.

The metadata 206, 212 is utilized and analyzed by the general API 204 to determine the respective content provider locations, column mappings, filters and filtering methods at 420.

The general API 204 constructs queries that are utilized to search each respective data source and filters are applied based on the metadata 206, 212 at 422. The queries are then sent from the general API 204 to the content providers 208, 214 for the respective application data records that are being searched at 424. Multiple content providers may be queried at the same time using multi-threading.

The results of the queries are sent back from the respective content providers 208, 214 to the general API 204 at 426 and 432. The results of the query that are received at the general API 204 are then converted by the general API 204 to the unified format utilizing the column mappings from the metadata 206, 212 at 428 and 434.

After converting to the unified format, the general API 204 notifies the search client 202 of the results of the search at 430 and 436. The results of the search are then provided by displaying the search results in the search client in the unified data format using generic logic.

Advantageously, utilizing metadata that includes information to identify the location of the data records associated with the application, a mapping for associating data in the data records with a unified format utilized by a search client, and an identification of filterable fields and the filtering method, unified search results across a plurality of applications may be provided. Thus, each application that provides content in a structure that varies from application data source to application data source may be searched, filtered, and displayed consistently.

According to one aspect, a method of searching for data records on a portable electronic device is provided. The method includes, for each application of a plurality of applications executable by the portable electronic device, storing respective associated metadata identifying a location of the data records associated with the application, a mapping for associating data in the data records with a unified format utilized by a search client, and an identification of filterable fields and the filtering method. The method also includes, in response to receipt of a search query at the search client, utilizing the metadata stored in association with the plurality of applications to perform a search of the data records and identify a plurality of the data records that accord with the search query to provide search results, and providing the search results in a unified format on the portable electronic device.

According to one aspect, a portable electronic device is provided. The portable electronic device includes a display for displaying results of a search for data records, and a memory for storing a plurality of applications and, for each application of the plurality of applications, respective associated metadata identifying a location of the data records associated with the application, a mapping for associating data in the data records with a unified format utilized by a search client, and an identification of filterable fields and the filtering method. The portable electronic device also includes a processor coupled to the display and to the memory to utilize the metadata stored in association with the plurality of applications to perform a search of the data records and identify a plurality of the data records that accord with the search query to provide search results, and provide the search results in a unified format on the portable electronic device.

The scope of the claims should not be limited by the preferred embodiments set forth in the examples, but should be given the broadest interpretation consistent with the description as a whole.

What is claimed is:

1. A method of searching for data records associated with a plurality of applications executable by a portable electronic device, the method comprising:
    prior to receiving a search query, for each application of the plurality of applications executable by the portable electronic device, identifying by the portable electronic device, and storing in a memory of the portable electronic device, respective associated metadata identifying:
        a location of the data records associated with the respective application,
        a mapping of data columns in the data records to respective unified format columns of a unified format utilized by a search client, and filter information including an identification of filterable fields of the data records associated with the application and a filtering method utilized by the application;
    in response to receipt of a search query at the search client:
        constructing, by the search client, a separate application search query for each application of the plurality of applications executable by the portable electronic device, each application search query is constructed utilizing the location of the data records associated with the respective application, the mapping of data columns in the data records to respective unified format columns of a unified format utilized by the search client, and the filter information including an identification of filterable fields of the data records associated with the application and the filtering method utilized by the application of the associated metadata stored in association with the respective application;

performing, by the search client and utilizing the application search query, a separate search of each of the data records associated with each application of the plurality of applications executable by the portable electronic device, each search generating a search result that includes a plurality of the data records associated with the respective application that accord with the application search query;

converting, by the search client, the data records of each of the search results generated by the performed searches into the unified format utilizing the mapping of data columns of the metadata associated with the respective application; and displaying the search results of each of the separate searches in a unified search result in the unified format on a display of the portable electronic device.

2. The method according to claim 1, wherein, for each application of the plurality of applications, the metadata is stored in association with a content provider that manages access to the data records associated with the application.

3. The method according to claim 1, wherein all the metadata for the plurality of applications is stored in a single file on the portable electronic device such that the single file includes metadata associated with the plurality of applications.

4. The method according to claim 1, wherein the metadata for each application of the plurality of applications is stored in a single file with the associated one of the plurality of applications.

5. The method according to claim 1, wherein identifying respective associated metadata comprises searching for the metadata in memory of the portable electronic device to identify all metadata prior to utilizing the metadata stored in association with the plurality of applications.

6. The method according to claim 1, wherein identifying respective associated metadata comprises identifying additional metadata associated with an additional application upon installation of the application on the portable electronic device.

7. The method according to claim 1, comprising utilizing a general application programming interface (API) for performing the separate searches of the data records utilizing the constructed application search queries associated with the plurality of applications.

8. The method according to claim 7, wherein the search query is received in a search application on the portable electronic device and the search application utilizes the API for performing the search and provides the search results.

9. A portable electronic device comprising:
a display for displaying results of a search for data records;
a memory for storing a plurality of applications and, for each application of the plurality of applications, respective associated metadata identifying:
a location of the data records associated with the respective application,
a mapping of data columns in the data records to respective unified format columns of a unified format utilized by a search client, and filter information including an identification of filterable fields of the data records associated with the application and a filtering method utilized by the application;

a processor coupled to the display and to the memory to:
prior to receiving a search query, identify, for each application of the plurality of applications, respective associated metadata, and store the identified metadata in the memory;
in response to receipt of a search query by the search client:
construct, by the search client, a separate application search query for each application of the plurality of applications, each application search query constructed utilizing the location of the data records associated with the respective application, the mapping of data columns in the data records to respective unified format columns of a unified format utilized by the search client, and the filter information including an identification of filterable fields of the data records associated with the application and the filtering method utilized by the application of the associated metadata stored in association with the respective application;
perform, by the search client and utilizing the application search query, a separate search of each of the data records associated with each application of the plurality of applications, each search generating a search result that includes a plurality of the data records associated with the respective application that accord with the application search query;
convert, by the search client, the data records of each of the search results generated by the performed searches into the unified format utilizing the mapping of data columns of the metadata associated with the respective application; and
display the search results of each of the separate searches in a unified search result in the unified format on the display of the portable electronic device.

10. The portable electronic device according to claim 9, wherein, for each application of the plurality of applications, the metadata is stored in association with a content provider that manages access to the data records associated with the application.

11. The portable electronic device according to claim 9, wherein all the metadata for the plurality of applications is stored in a single file in memory on the portable electronic device such that the single file includes metadata associated with the plurality of applications.

12. The portable electronic device according to claim 9, wherein the metadata for each application of the plurality of applications is stored in a single file with the associated one of the plurality of applications.

13. The portable electronic device according to claim 9, wherein the processor configured to identify metadata comprises the processor configured to identified metadata stored in the memory of the portable electronic device to identify all metadata stored in association with the plurality of applications.

14. The portable electronic device according to claim 9, wherein the processor configured to identify metadata comprises the processor configured to identify additional metadata associated with an additional application upon installation of the application on the portable electronic device.

15. The portable electronic device according to claim 9, wherein the processor utilizes a general application programming interface (API) for performing the separate searches of the data records utilizing the constructed application search queries associated with the plurality of applications.

16. The portable electronic device according to claim 15, wherein the search query is received in a search application executed by the processor and the search application utilizes the general API for performing the search and provides the search results.

* * * * *